United States Patent [19]

Black, Jr.

[11] 4,093,072
[45] June 6, 1978

[54] VARIABLE ATTENUATION SUPPORT SYSTEM

[75] Inventor: Robert R. Black, Jr., Newport Beach, Calif.

[73] Assignee: Plastics Research Corporation, Cerritos, Calif.

[21] Appl. No.: 658,190

[22] Filed: Feb. 17, 1976

[51] Int. Cl.² ............................................. F16M 13/00
[52] U.S. Cl. .................................. 206/521; 248/358 R
[58] Field of Search ............... 248/18, 22, 358 R, 378, 248/379, 399, 10; 206/521

[56] References Cited

U.S. PATENT DOCUMENTS

| | | | |
|---|---|---|---|
| 2,262,442 | 11/1941 | Anderson | 248/358 R X |
| 2,682,295 | 6/1954 | Hickman | 248/400 UX |
| 2,756,952 | 7/1956 | Gazley | 248/22 X |
| 3,268,200 | 8/1966 | Eicher | 248/379 X |
| 3,949,878 | 4/1976 | Doane | 206/521 |

FOREIGN PATENT DOCUMENTS

| | | | |
|---|---|---|---|
| 507,045 | 11/1954 | Canada | 248/18 |
| 546,004 | 6/1942 | United Kingdom | 248/22 |
| 553,793 | 7/1943 | United Kingdom | 248/10 |

Primary Examiner—William H. Schultz
Attorney, Agent, or Firm—Christie, Parker & Hale

[57] ABSTRACT

A variable attenuation support system for a payload. A base support and a payload support are separated. A plurality of mounting pads are affixed to the base support, one such pad substantially at each corner of a first imaginary shaped plane. A plurality of mounting pads are affixed to the payload support, one such pad substantially at each corner of a second imaginary shaped plane which is similar in shape to, but larger than, and parallel to, the first plane. The planes are spaced apart and are relatively centered with corresponding sides parallel. A pair of pads are formed at each of the corresponding corners of the planes. An adjustable shock mount is provided for each of the pairs of pads. Each adjustable shock mount comprises a plurality of separable resilient shock absorbers, means for connecting a first one of the shock absorbers between the corresponding pair of pads, and means for releasably locking at least a second one of the shock absorbers in between the corresponding pair of pads.

11 Claims, 3 Drawing Figures

VARIABLE ATTENUATION SUPPORT SYSTEM

BACKGROUND OF THE INVENTION

This invention relates to mounting systems and more particularly to shock mounting systems for isolating a payload support from a base support.

Fragile equipment generally requires protection against severe impacts, vibrations and other shocks. The problem is particularly acute during shipping.

Special shipping containers have been designed which include a payload support for supporting the fragile equipment, a base support which generally forms the lower portion of the shipping container, and isolators for affixing the payload support to the base support.

The loads imparted to the payload on the payload support are a function of the system natural frequency. The system natural frequency can be expressed as follows:

$$f = \tfrac{1}{2}\pi \sqrt{k/m},$$

where
$k$ = the spring constant (pounds/inch) and
$m$ = the spring supported mass (pounds sec²/in)

Thus, as the frequency increases, so do the forces to the payload. Also, as $k/m$ increases, so do the forces imparted to the payload. Any increase or decrease in mass of the isolation supported mass must be accompanied by a proportional increase or decrease in the spring constant to maintain the forces imparted to the payload at a constant level.

Generally the isolation system for shipping containers is specifically designed for the mass of the particular payload which is being shipped. Accordingly, the spring constants of the isolators are selected according to the mass of the payload which is to be shipped in the container and another container must be designed for a payload with a different mass.

SUMMARY OF THE INVENTION

Briefly, an embodiment of the present invention is a variable attenuation support system for a payload. Included is a base support and a payload support separated from the base support. A plurality of mounting pads are affixed to the base support and to the payload support. A plurality of pairs of the pads are formed in which one pad of the pairs is on the base support and one on the payload support. An adjustable shock mount is provided for each of the pair of pads. Each adjustable shock mount comprises a plurality of resilient shock absorbers, means for connecting the first one of the shock absorbers between the corresponding pair of pads, and means for locking and unlocking at least a second one of the shock absorbers between the corresponding pair of pads. With this construction, adjustment of the spring constant contained in the above mentioned formula is made possible by locking and unlocking the shock absorbers as required to change the stiffness of the system.

Preferably, means is provided for locking and unlocking more than one of the resilient shock absorbers between the corresponding pair of pads, thereby providing further variations in the stiffness of the system.

According to a preferred embodiment of the invention, means is provided for permanently connecting one of the shock absorbers between the corresponding pair of pads. This prevents an operator from inadvertently disconnecting the payload support from the base support.

According to a still further preferred embodiment of the invention, the locking and unlocking means involves means for pivotally mounting one of the corresponding shock absorbers to one of the pads. A manually operable lock locks and unlocks the other end of the same shock absorber to the other pad in the corresponding pair of pads.

According to a still further preferred embodiment of the invention, the manually operable lock includes a first connector part affixed to the corresponding pad and a second part affixed to the corresponding end of the resilient shock absorber, and manually actuable means for locking and unlocking the locking parts.

A still further preferred embodiment of the invention comprises means for securing an unlocked shock absorber out of an interfering position with the payload support.

An even further preferred embodiment of the invention has the pads on the base support arranged with one pad substantially at each corner of a first imaginary shaped plane. The pads on the payload support are arranged with one at each corner of a second imaginary shaped plane which is similar in shape to, larger than, and parallel to the first. The planes are spaced apart and relatively centered with corresponding sides parallel. A pair of pads are formed at each of the corresponding corners of the two planes. With this arrangement the shock absorbers act in various combinations of shear, compression and tensile deformation, providing a more linear lighter load range shock absorbing system.

According to a preferred embodiment of the invention, each of the imaginary planes is rectangular in shape, providing a symmetrically balanced system.

Preferably the movable locking means comprises a pin and the first and second locking parts comprise an opening for receiving the pin, thereby providing a simple, low cost locking arrangement which is easy to lock and unlock.

A still further preferred embodiment of the invention involves a means for securing the pin to one of the locking parts during both the locking or unlocking conditions to thereby prevent the pin from being lost during shipping. Preferably the means for securing is a spring clip.

DRAWINGS

THE INVENTION

Figure 1:
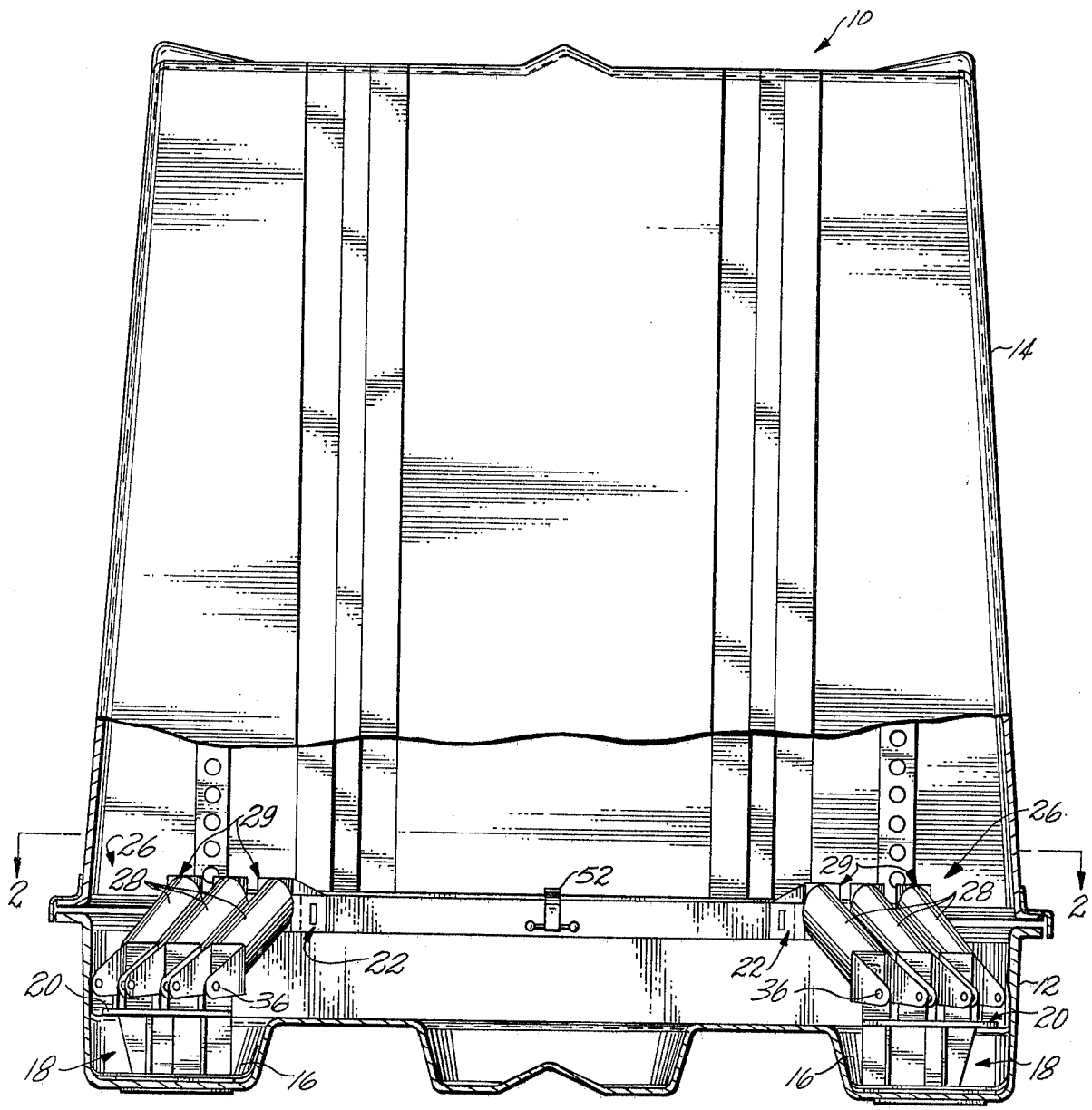
FIG. 1 is a side elevation view, partially broken away, of a variable attenuation support system for a payload and embodying the present invention.
Figure 2:
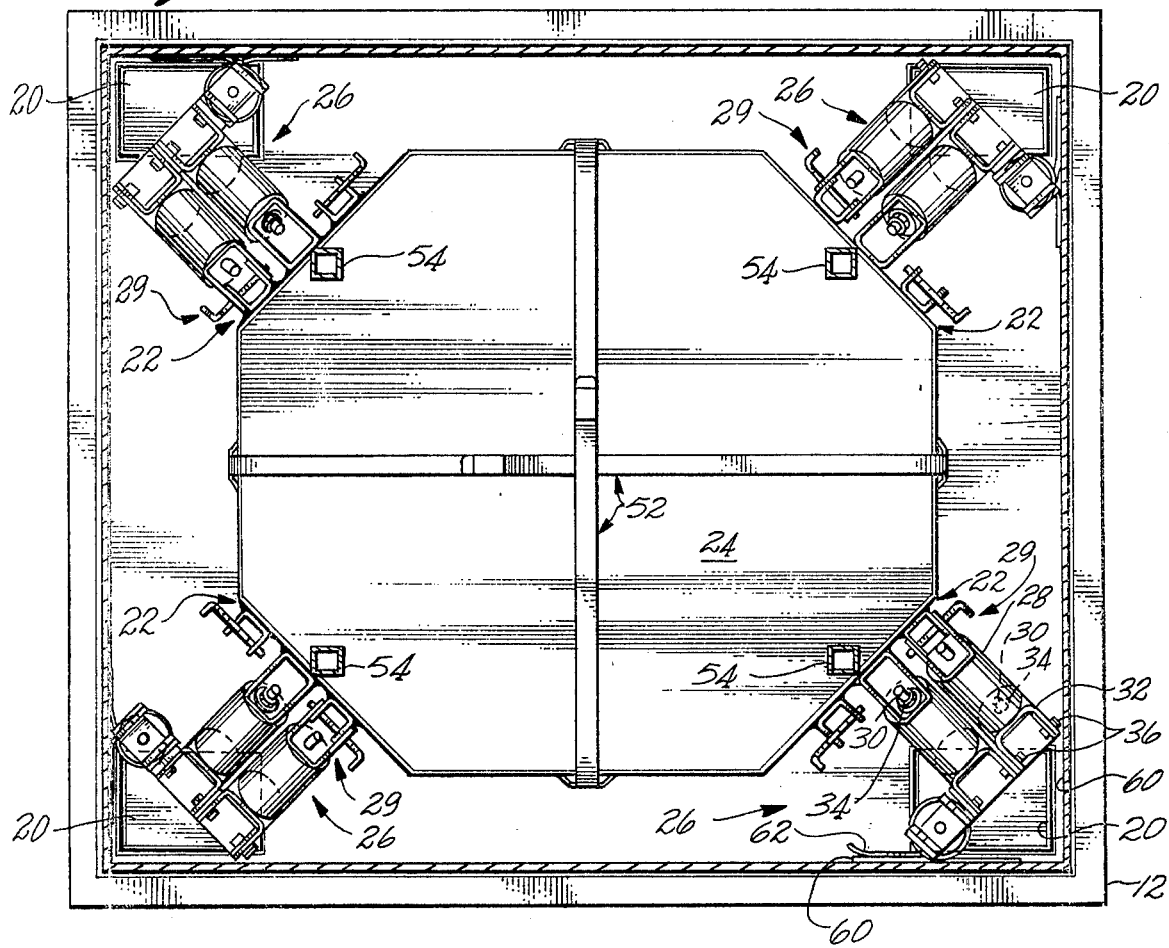
FIG. 2 is a top elevation view of the payload support, the base support and the adjustable shock mounts.
Figure 3:
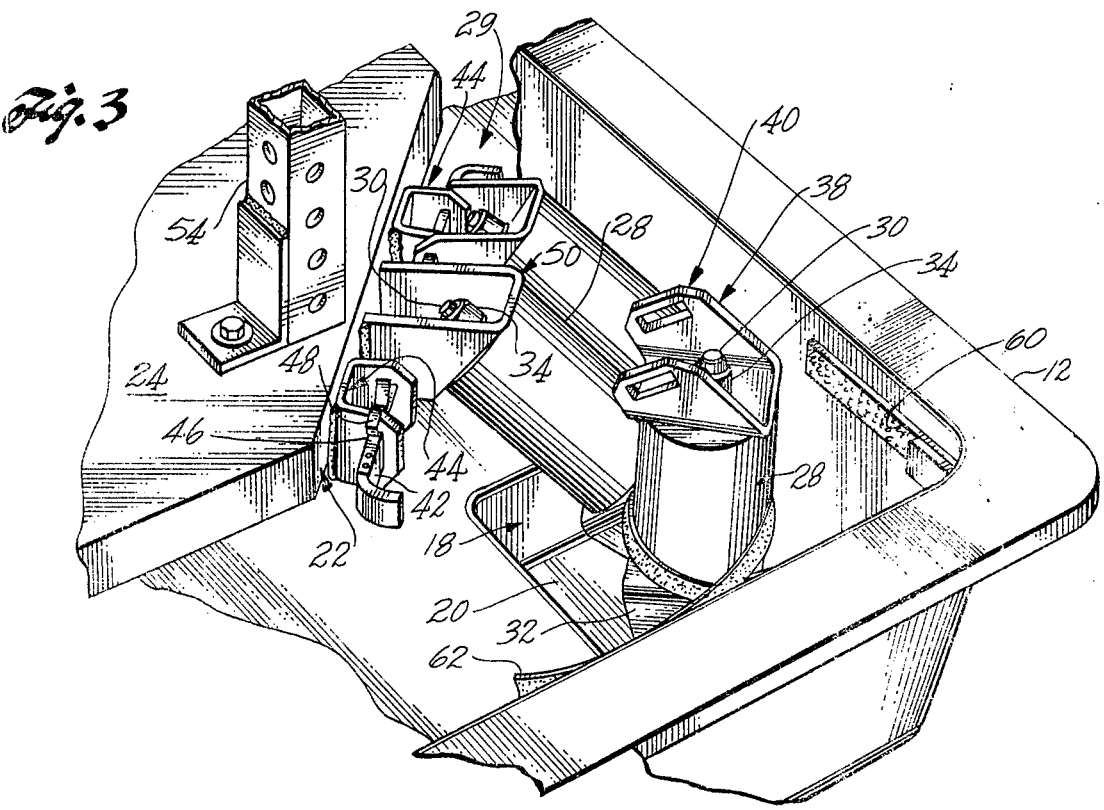
FIG. 3 is an enlarged elevation view of the adjustable shock mount employed in the variable attenuation support system of FIG. 1.

FIGS. 1, 2 and 3 show a variable attenuation support system for a payload and embody the present invention.

Specifically, there is shown a container 10 having a base support 12 and a cover 14 forming an enclosure.

Though it is not material to the present invention, each corner of the base support has a recessed portion 16.

A support mount 18 is provided in each of the recesses 16 in order to extend the structure of the base support up to the top of the recesses. On the top of each support mount is a mounting pad 20 which is affixed through the support mount 18 to the bottom of the recess 16 of the base support 12. Preferably the base support and cover are fiber glass and the support mounts 18 are molded in place. With reference to FIG. 2 it will be seen that there are a plurality of mounting pads 20 affixed to the base support 12, one such pad being positioned substantially at each corner of the base support.

Corresponding to each mounting pad 20 on the base support there is provided a corresponding mounting pad 22. The payload support member 24 is completely separated from and in fact isolated from the base support 12 through an adjustable shock mount 26 located at each corner of the base support 12.

Although the actual number is not material to the scope of the invention, each adjustable shock mount 26 includes a plurality of three separate, resilient shock absorbers or isolators 28. Each isolator 28 is in the form of a cylindrical shaped elastomer material having the desired resilient shock mount properties with a pin 30 extending from each end. The pin 30 is embedded in each end of each isolator for mounting purposes.

Significantly, means including the pin 30 are provided for connecting the ends of each isolator 28 to the corresponding pads 20 and 22.

Of considerable importance to the present invention is a releasable lock 29 for locking and unlocking at least one of the isolators 28 in each adjustable shock mount 26 in between the corresponding pair of pads 20 and 22. A bracket 32 is affixed by means of a nut 34 to one of the pins 30 embedded in the corresponding isolator 28. The bracket 32 is pivotally mounted by means of pivots 36 to an upstanding portion on the corresponding pad 20. In this manner, the upper end of the isolators 28 may be rotated toward and away from the pad 22 by the pivotal mounting means 36,32,18.

A first locking part in the form of a U shaped bracket 38 is affixed by means of another nut 34 and the pin 30 to the end of the isolator 28 which is opposite from the pivotal mounting. The U shaped bracket 38 has a rectangular shaped opening 40 through each leg through which a movable locking member or means in the form of a pin 42 (rectangular in cross section) may be inserted and removed. A second locking part in the form of a U shaped bracket 44 is affixed to the mounting pad 22 on the payload support 24. The bracket 44 also has an opening 46 in each leg similar in shape to the opening 40 through which the pin 42 is positioned. With this arrangement, the isolator 28 may be rotated upward as depicted in FIG. 3, out of engagement with the bracket 44, and hence the payload support 24. Alternately, the pin 42 may be removed and the isolator 28 may be rotated down until the openings 40 and 46 are in alignment and the pin 42 inserted to lock the brackets 38 and 44 together and thereby lock the isolator between the corresponding mounting pads 20 and 22. Thus the brackets 46 and 38, and the pin 42 form means for manually locking and unlocking the isolators 28 between the pads 20 and 22.

Of interest to a preferred embodiment of the present invention, means is provided for securing the pin 42 to the bracket 44 during the locked and unlocked conditions. In this regard a spring clip 48 is affixed on each of the pins 42 and when the pin 42 is inserted into the opening 46, as depicted in FIG. 3, the spring clip moves over the side of the leg of the bracket 44, thereby securing the pin so that it will not accidentally fall out during movements of the container.

An arrangement of the type discussed above is provided for releasably locking the two outer isolators 28 of each adjustable shock mount 26 between the mounting pads 20 and 22. However, the mounting structure for the center isolator 28 differs. In this regard, the center isolator is permanently connected to the pad 22 by means of a U shaped bracket 50 whose legs are affixed to the pad 22 and the bottom of which is affixed by means of the bolt and nut 34 to the corresponding isolator 28. Having one isolator permanently affixed in between the pads 20 and 22 ensures that the user will not inadvertently disconnect all isolators and thereby allow the payload support 24 to become disconnected from the base support 12.

With the foregoing construction, the middle isolator 28 (permanently affixed) establishes the lowest system stiffness. Thus the lowest system stiffness is established with the two outer isolators disconnected and rotated upward, only leaving the center isolator 28 connected in between the pads 20 and 22.

Increased stiffness is achieved by rotating one of the rotatable isolators 28 so that the openings 40 and 46 are aligned and then inserting the corresponding pin 42 through the openings. This condition is depicted in FIG. 2. A still further increase in stiffness is obtained by locking the remaining isolators 28 in place, providing three isolators at each corner.

Significantly, in one preferred embodiment of the invention the cylindrical shaped isolators 28 when locked are positioned at an angle to the payload support 24 with the axes of all isolators focused at a point above the center of the payload support. This is significant in that it provides a system stiffness directionally tailored according to the anticipated accelerations, by employing all isolators always in various combinations of shear and compression and tensile forces.

The isolators may be in the form of a spring or elastomer body or other form of resilient shock absorbing device within the broader concepts of this invention. Isolators particularly of the elastic material type disclosed herein work best in shear because a more linear load deflecting curve results and covers a wider load range than when operated purely in compression or tension. By orienting the isolators into their locked positions, it is impossible to place them in pure compression or tension as would be possible if the isolators extend vertically between the pads 20 and 22.

It will be understood that the pads on the base support are arranged in an imaginary rectangular shaped plane, whereas the mounting pads on the payload support are arranged in a second imaginary rectangular shaped plane which is similar to, larger than, and parallel to the first. These planes are spaced apart and are relatively centered with corresponding sides parallel. With such an arrangement a very evenly distributed load is possible, making most effective use of the adjustable shock mount system described hereinabove.

According to a preferred embodiment of the invention, means is provided for each shock mount at each corner for securing the unlocked isolators 28 out of the way of the payload support. In this regard, a Velcro (a registered trademark of American Velcro, Inc.) hooks and pile strip 62 is affixed, extending outwardly in each direction from each corner of the base support 12. An additional Velcro strip 62 is affixed by fiber glass to the inside surface of the payload support 12 and is large enough to wrap around either one or both of the rotatable isolators 28 and then be affixed to one of the Velcro strips extending in each direction from each corner of the payload support 12. In this manner, the isolators 28 which are not locked into use can be held out of interference with the operation of the rest of the adjustable shock mount system and the payload support 24.

Significantly the lock disclosed herein provides a low cost and "no-tools" adjustable shock mount system which is easy and quick to operate for changing system stiffness for widely varying weights or groups of fragile equipment of varying quantities.

Belts and belt buckles 52 are shown by way of example for fastening a payload to the payload support. A support system 54 is provided for a further payload support (not shown) should it be required.

Although an exemplary embodiment of the invention has been disclosed for purposes of illustration, it will be understood that various changes, modifications and substitutions may be incorporated into such embodiment without departing from the spirit of the invention as defined by the claims appearing hereinafter.

What is claimed is:

1. A variable attenuation support system for a payload comprising:
   a base support;
   a payload support separated from the base support;
   a plurality of mounting pads affixed to said base support;
   a plurality of mounting pads affixed to said payload support, a plurality of pairs of said pads being formed in which one pad of said pair is on said base support and one on said payload support; and
   an adjustable shock mount for each said pair of pads, each adjustable shock mount comprising a plurality of resilient shock absorbers, means for connecting a first one of said shock absorbers between the corresponding pair of pads, and means for locking and unlocking at least a second one of said shock absorbers between the corresponding pair of pads, said locking and unlocking means comprising means for pivotally mounting one end of the corresponding shock absorber to one of the pads in the corresponding pair of pads and a manually operable lock for locking and unlocking the other end of the same shock absorber to the other pad in the corresponding pair of pads.

2. A variable support system according to claim 1 wherein the manually operable lock comprises a first connector part affixed to the corresponding pad and a second connector part affixed to the corresponding end of the resilient shock absorber and manually actuable means for locking and unlocking said locking parts.

3. A variable support system according to claim 2 comprising means for securing an unlocked shock absorber out of an interfering position with said payload support.

4. A variable attenuation support system for a payload comprising:
   a base support;
   a payload support separated from the base support;
   a plurality of mounting pads affixed to said base support, one such pad substantially at each corner of a first imaginary plane;
   a plurality of mounting pads affixed to said payload support, one such pad substantially at each corner of a second imaginary plane which is similar in shape to, smaller than and parallel to the first, such planes being spaced apart and relatively centered, with corresponding sides parallel, a pair of pads being formed at each of the corresponding corners of such planes; and
   an adjustable shock mount for each such pair of pads, each adjustable shock mount comprising a plurality of individual resilient shock absorbers, means for connecting said plurality of shock absorbers between the corresponding pair of pads, at least one of said connecting means comprising means for pivoting one end of at least one of said shock absorbers to the corresponding pad, a first locking part on the other end of the same shock absorber, a second locking part on the other pad to which said other end of the same shock absorber is connectable, and a movable locking means for interconnecting said first and second locking parts.

5. A variable support system according to claim 4 wherein said movable locking means comprises a pin and said first and second locking parts comprise an opening for receiving said pin.

6. A variable support system according to claim 5 comprising means for securing said pin to one of said locking parts during both the locked and unlocked conditions.

7. A variable support system according to claim 6 wherein said means for securing comprises a spring clip.

8. A variable support system according to claim 4 comprising means for each said shock mount for securing at least one of the corresponding unlocked shock absorbers rotated out of the way of said payload support.

9. A variable support system according to claim 4 wherein said shock absorber comprises:
   an elongated resilient material;
   a pin in said resilient material for affixing the resilient material to the pivotal mounting means;
   said first locking part comprising a U shaped bracket having an opening therethrough;
   a pin in said resilient material for affixing same to said bracket;
   said second locking part comprising a U shaped bracket, the legs of the U shaped brackets each comprising an opening, said movable locking means comprising a removable pin for insertion through the openings of said brackets.

10. A variable support system according to claim 4 comprising means for securing a payload to said payload support.

11. A variable support system according to claim 10 comprising an enclosure container for said support system.

* * * * *